United States Patent
Suryanarayana

(10) Patent No.: US 12,321,623 B2
(45) Date of Patent: Jun. 3, 2025

(54) EMBEDDED GPT PARTITION WITH HYBRID BOOT LOAD PROTOCOL

(71) Applicant: DELL PRODUCTS L.P., Round Rock, TX (US)

(72) Inventor: Shekar Babu Suryanarayana, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 135 days.

(21) Appl. No.: 17/949,482

(22) Filed: Sep. 21, 2022

(65) Prior Publication Data

US 2024/0094929 A1    Mar. 21, 2024

(51) Int. Cl.
G06F 3/06    (2006.01)

(52) U.S. Cl.
CPC .......... G06F 3/0632 (2013.01); G06F 3/0604 (2013.01); G06F 3/0683 (2013.01)

(58) Field of Classification Search
CPC ..... G06F 3/0632; G06F 3/0604; G06F 3/0683
USPC ......................................................... 710/10
See application file for complete search history.

(56) References Cited

U.S. PATENT DOCUMENTS

| | | | |
|---|---|---|---|
| 5,987,605 A * | 11/1999 | Hill | H04L 12/40123 714/E11.133 |
| 7,734,945 B1 * | 6/2010 | Levidow | G06F 11/0793 714/3 |
| 8,386,759 B1 * | 2/2013 | Duwel | G06F 9/4401 326/39 |
| 8,443,183 B2 * | 5/2013 | Lin | G06F 9/4406 713/1 |
| 8,499,151 B2 | 7/2013 | Durham et al. | |
| 8,983,983 B2 | 3/2015 | Antonysamy | |
| 9,185,079 B2 | 11/2015 | Saxena et al. | |
| 9,372,988 B2 | 6/2016 | Thadikaran et al. | |
| 9,419,976 B2 | 8/2016 | Gilani et al. | |
| 9,547,772 B2 | 1/2017 | Durham et al. | |
| 9,916,454 B2 | 3/2018 | Thadikaran et al. | |
| 10,916,326 B1 * | 2/2021 | Holmberg, Jr. | G06F 11/073 |
| 2003/0014622 A1 * | 1/2003 | Larvoire | G06F 9/441 713/2 |
| 2008/0077767 A1 | 3/2008 | Khosravi et al. | |
| 2009/0282232 A1 * | 11/2009 | Ugokwe | G06F 9/4401 711/E12.008 |
| 2012/0089826 A1 * | 4/2012 | Ugokwe | G06F 13/10 713/2 |
| 2013/0151734 A1 * | 6/2013 | Ugokwe | G06F 13/10 710/5 |

(Continued)

Primary Examiner — Titus Wong
(74) Attorney, Agent, or Firm — Jackson Walker LLP; Christopher J. Rourk

(57) ABSTRACT

A system for data processing, comprising a data processor configured to execute one or more algorithms stored in an internal memory device, a plurality of external data memory devices coupled to the data processor, each external data memory device including a header having predetermined data stored therein and a boot load protocol coupled to the data processor and the plurality of external data memory devices, the boot load protocol configured to interface with the data processor and the header of each of the plurality of external data memory devices and to generate a series of control data structures for use by the data processor to select one of the plurality of external data memory devices for use by the data processor.

19 Claims, 3 Drawing Sheets

(56) References Cited

U.S. PATENT DOCUMENTS

| | | | |
|---|---|---|---|
| 2015/0309803 A1* | 10/2015 | Sahu | G06F 9/4403 |
| | | | 714/21 |
| 2016/0234019 A1* | 8/2016 | Goss | H04W 12/102 |
| 2018/0011649 A1 | 1/2018 | Hashimoto et al. | |
| 2021/0064386 A1* | 3/2021 | Bak | G06F 3/0644 |
| 2021/0124711 A1* | 4/2021 | Ansari | G06F 11/0772 |
| 2021/0173945 A1 | 6/2021 | Karr et al. | |
| 2021/0240637 A1* | 8/2021 | Goss | H04W 12/069 |
| 2022/0019443 A1* | 1/2022 | Benisty | G06F 3/0659 |

* cited by examiner

EMBEDDED GPT PARTITION WITH HYBRID BOOT LOAD PROTOCOL

TECHNICAL FIELD

The present disclosure relates generally to data processing systems, and more specifically to an embedded globally unique identifier (GUID) partition table (GPT).

BACKGROUND OF THE INVENTION

Data processing systems can experience misoperation due to integration problems between components.

SUMMARY OF THE INVENTION

A system for data processing is provided, such as a personal computer, that includes a data processor configured to execute one or more algorithms stored in an internal memory device. A plurality of external data memory devices are connected to the data processor, and each includes a header having predetermined data stored therein. A boot load protocol is connected to the data processor and the plurality of external data memory devices and is configured to interface with the data processor and the header of each of the plurality of external data memory devices, such as to generate a series of commands that can be used by the data processor to select one of the plurality of external data memory devices for use by the data processor for a task or function.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
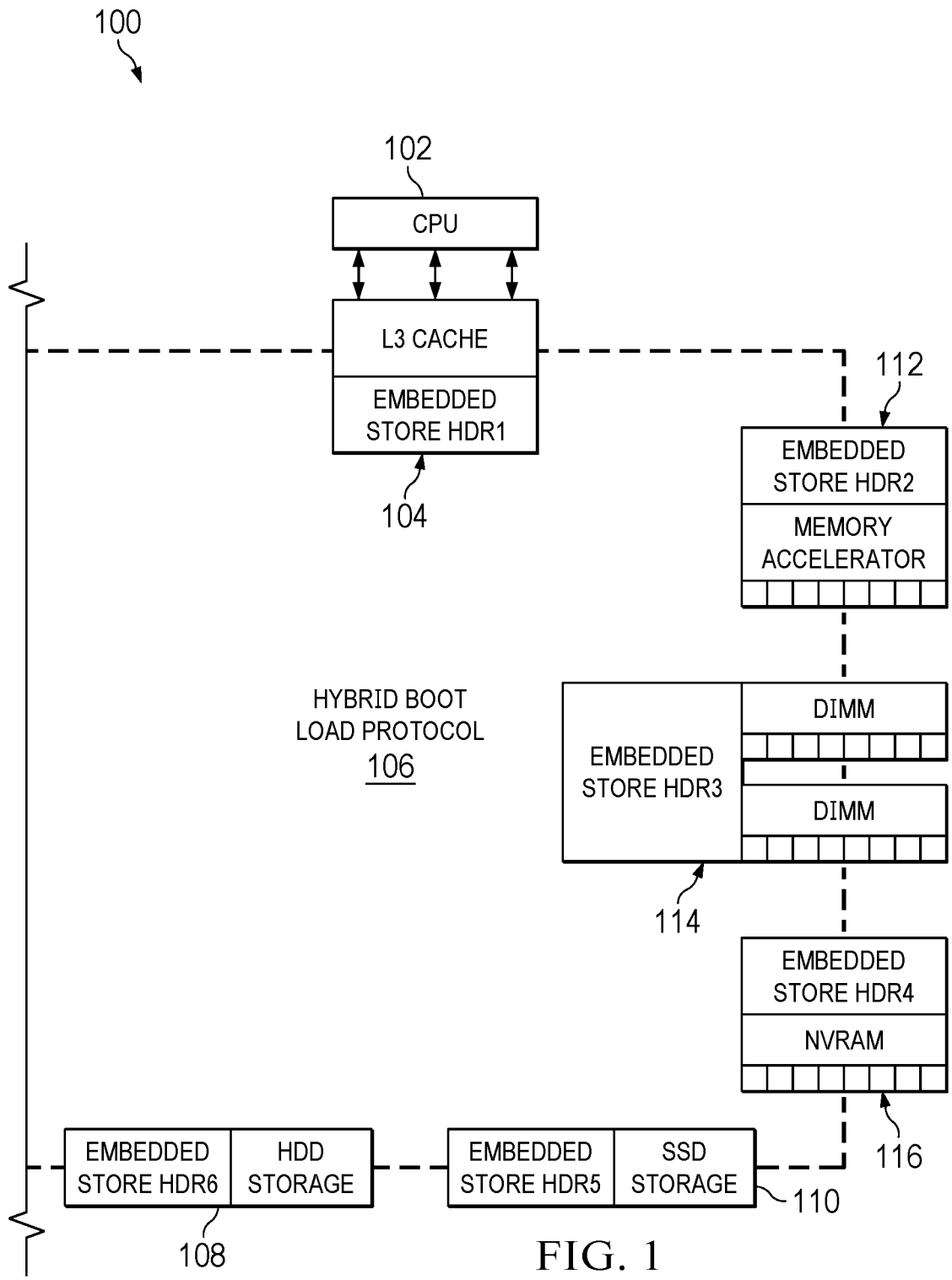
FIG. 1 is a diagram of a system with an embedded GPT partition with hybrid boot load protocol, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Existing storage components and systems, such as Intel Rapid Storage Technology (RST), can be configured to support the configuration and enabling of multiple features, such as system acceleration with Intel Optane Memory, configuration and maintenance of various redundant array of independent devices (RAID) levels, and AMD StoreMI. These technologies use 3D NAND fabrication techniques to achieve super-low latency, potentially as fast as 10 microseconds. Nevertheless, due to 3rd party driver dependency and changes in various storage configurations, the operating system (OS) deployment and boot process may be halted at times, and can become highly vulnerable if there is no global adaptive metadata partition to decode and inter-link. This condition can create a number of problems.

One such problem is that if any changes occur to storage configurations across RAID to non-RAID memory, the OS boot process may be halted due to unidentified metadata and the presence of incompatible drivers. In this state, there is no adaptive storage metadata module to emulate the heterogeneous boot loading.

Another problem is that the system operations can freeze intermittently during standby (which may be referred to as the blue screen of death), with a high failure rate on some OS's such as the Microsoft Windows OS. This condition can occur due to changes in the power policy in the OS the mechanism that causes the OS to enter a standby mode during memory access processes.

Yet another problem is that the Microsoft Windows OS installation halts on some platforms, such as Intel, to load any required Intel Rapid Storage Technology drives, to dynamically manage the storage configurations on system with RAID mode enabled, or for other reasons. This state can also interrupt operation as a result of memory access issues.

Third party components, such as SQLite dynamic link libraries (DLLs), can also cause problems with the Intel Optane Memory, which can have dependency, non-functional issues and security vulnerabilities. In addition, the Intel Optane Memory and AMD StoreMi can become intermittently stuck in a low performance mode after resuming operations from a standby mode upon occurrence of an Address Event Representation (AER), if resetting of input/output delay fails to disengage. In this state, the system can fail to recover performance even after multiple reboots.

The present disclosure provides a number of advantages that can solve these and other problems, based on the previously unidentified cause that they result from memory incompatibility issues. An embedded GUID Partition Table (GPT) store is provided to dynamically build adaptive intelligence across heterogeneous storage modules to resolve potential issues with incompatible memory devices and systems, and to provide a seamless OS boot and OS deploy operations without any boot halts.

Another advantage is a hybrid storage metadata protocol that is provided to dynamically enumerate and load the storage abstractions, in order to migrate the boot load operations across various system on a chip (SoC) and third party modules. This hybrid metadata protocol protects the different systems and components from misoperation due to memory system and component incompatibility.

A safe-storage adaptive bridge (SSAB) is also provided, to ensure functional and security-vulnerability-free load over any incompatible drivers and hardware. A learning method is also provided to continuously optimize block locations by intelligently identifying and migrating frequently accessed blocks to a fastest storage device or system.

The present disclosure emphasizes seamless OS boot and uninterrupted deployment of a safe embedded GPT store, which dynamically builds an adaptive intelligence to migrate heterogeneous storage metadata. The present disclosure also provides for secure OS load and deployment, which is useful for intelligent time divisional multiplexing (ITDM) and safe storage, to provide a full functional and vulnerability-free operations.

The present disclosure provides a number of use cases. A first example use case is a one stop storage acceleration and boot solution that supports multiple storage configurations, such as pass through storage (e.g. serial advanced technology attachment (SATA) solid state drive (SSD)/hard disk drive (HDD) and non-volatile memory express (NVMe) SSD (which can be third party systems on both the central processing unit (CPU) and on the platform controller hub (PCH)) and RAID storage (such as bootable RAID, switching across RAID and non-RAID, and RAID across CPU & PCH). The present disclosure provides flexibility to use multiple third party storage drives and enables seamless OS deployment, such as with a single Windows image. In other example embodiments, load times, boot times, file management and system responsiveness can be optimized, and faster gaming and response can be achieved with a safe storage adaptive bridge. The hybrid boot load protocol has intelligence to store/install OS/Applications based on the frequency of usage and performance requirements, and optimizes the block OS operations accordingly. The present disclosure also provides for partition migration and boot loader migrations for uninterrupted faster OS load/deploy, and allows an HDD to give performance like an SSD using the hybrid boot load protocol.

The present disclosure thus provides for 1) faster and seamless boot across different memory devices, 2) security for heterogeneous boot load operations with respect to third party drivers and vendor codes, as part of safe boot protocols, and 3) improved use for gaming applications, which can require faster storage and higher response times, and which can be provided by a safe storage bridge that intelligently identifies and migrates frequently accessed blocks to the fastest storage.

The embedded GPT store can be created to dynamically build an adaptive intelligence across heterogeneous storage modules, to provide a seamless OS boot and OS deploy operations without any boot halts. The hybrid boot load protocol can be implemented as a scattered floating store that is spread across multiple components, such as the L3 cache, persistent memory devices (such as Optane Memory), DIMM, NVRAM, SSD, HDD and other suitable memory devices. These diverse storage memories are essentially combined in a single memory system architecture using the disclosed a hybrid boot load protocol, to allocate data to a range of memory from the fastest to the slowest memory as a function of the data.

The block input/output (I/O) is migrated to faster memory dynamically based on the current operation execution requirement and frequency of execution. The embedded headers can be included in every storage component and reflex mapped to a persistent table in NVRAM as part of the hybrid boot load protocol, or can be implemented in other suitable manners.

The hybrid memory domain created by the hybrid boot load protocol is highly capable of failover boot detection and migration and enables faster boot/deploy/update operations by intelligently learning of a failure boot mode, to quickly migrate data storage to the next storage path in the hierarchy. The boot recovery mechanism can be cached into NVRAM with a reflex map table to locate available GPT based boot headers in each embedded GPT header.

The metadata can be reflex mapped into a hybrid boot load protocol header, so that from any storage path the current boot load can be located and recovered. Other suitable configurations can also or alternatively be used. The hybrid boot load protocol header can also be reflex mapped into each device embedded header, such as to allow the hybrid boot load protocol to implement an SoC agnostic chipset abstractions to memory map a data table into a runtime space, for dynamic recovery and vulnerability management from boot load modules or for other suitable purposes.

Third party drivers, such as RAID/Non-RAID, advanced host controller interface (ACHI)/SATA, Optane Memory, RST, AMD StoreMI, SQL Objects and so forth, can interface with an SoC agnostic driver layer to dynamically load the corresponding driver version, such as based on the current boot failure and vulnerability, or for other suitable purposes.

The hybrid boot load protocol can be configured to learn a boot progress status and act on the boot continuity functionality by reflex mapping the boot load module, the NVRAM, L3 Cache, Optane memory or other suitable memory devices. The memory devices can be enumerated and initialized during the pre-extensible firmware interface (EFI) initialization (PEI) phase and DIMM can be initialized during direct action everywhere (DXE) to provide for a reflex-mapped table load. The current boot status entries can be executed as a function of a hybrid metadata index, or in other suitable manners.

The SSD and HDD can be the primary source of boot load modules. In that case, a faster migration support based on boot type can be enumerated, and dynamic migration can happen over the hybrid boot load protocol.

A third party interface and faulty boot path learning module can be used to input the history and current boot failure status to the a safe storage adaptive bridge, to load the persistent boot data, to load and locate reflex mapped table into memory, to locate the recovery boot loader, or for other suitable purposes. Also, the faster migration of data is different from boot mode, and can be controlled by an adaptive bridge logic, along with block I/O migration based on frequency of access to provide faster I/O and other suitable functions.

FIG. 1 is a diagram of a system 100 with an embedded GPT partition with hybrid boot load protocol, in accordance with an example embodiment of the present disclosure. System 100 includes CPU 102, L3 cache 104, hybrid boot load protocol 106, HDD storage 108, SSD storage 110, memory accelerator 112, dual in-line memory module (DIMM) 114 and non-volatile random access memory (NVRAM) 116, each of which can be implemented in hardware or a suitable combination of hardware and software.

CPU 102 can be a central processing unit that loads one or more algorithms from a memory device and executes the algorithms to cause CPU 102 to interface with hybrid boot load protocol 106, such as through L3 cache 104 or in other suitable manners. In one example embodiment, access to memory devices of system 100 by CPU 102 can be configured for boot operations, normal operations or in other suitable manners.

L3 cache 104 can be implemented as memory devices and one or more memory controllers, and can function as an adjunct to memory contained within CPU 102. L3 cache 104 can include embedded store Hdr1, which can be used by hybrid boot load protocol 106 to select a suitable memory device for a specific application.

Hybrid boot load protocol 106 can be one or more algorithms that are configured to be loaded into operational memory of CPU 102, L3 cache 104, HDD storage 108, SSD storage 110, memory accelerator 112, DIMM 114, NVRAM 116 and other suitable devices, such as in conjunction with one or more objects, agents or in other suitable manners. In one example embodiment, hybrid boot load protocol 106 can be configured to interface with embedded store headers, such as Hdr1 through Hdr6, to select memory devices as a function of the type of data that is being stored, such as to store more frequently used data in faster memory, less frequently used data in slower memory and for other suitable purposes as disclosed and discussed further herein.

HDD storage 108 can be implemented as memory devices and one or more memory controllers, and can function as an adjunct to memory contained within CPU 102. HDD storage 108 can include embedded store Hdr6, which can be used by hybrid boot load protocol 106 to select a suitable memory device for a specific application.

SSD storage 110 can be implemented as memory devices and one or more memory controllers, and can function as an adjunct to memory contained within CPU 102. SSD storage 110 can include embedded store Hdr5, which can be used by hybrid boot load protocol 106 to select a suitable memory device for a specific application.

Memory accelerator 112 can be implemented as memory devices and one or more memory controllers, and can function as an adjunct to memory contained within CPU 102. Memory accelerator 112 can include embedded store Hdr2, which can be used by hybrid boot load protocol 106 to select a suitable memory device for a specific application.

DIMM 114 can be implemented as memory devices and one or more memory controllers, and can function as an adjunct to memory contained within CPU 102. DIMM 114 can include embedded store Hdr3, which can be used by hybrid boot load protocol 106 to select a suitable memory device for a specific application.

NVRAM 116 can be implemented as memory devices and one or more memory controllers, and can function as an adjunct to memory contained within CPU 102. NVRAM 116 can include embedded store Hdr4, which can be used by hybrid boot load protocol 106 to select a suitable memory device for a specific application.

In operation, system 100 uses hybrid boot load protocol 106 to improve memory allocation and usage. Hybrid boot load protocol 106 obtains information from embedded stores on each memory device for use in determining the optimal location for data, as a function of the memory device, the type of data, the speed of access for the memory device, the frequency at which the data is accessed and other suitable factors.

Figure 2:
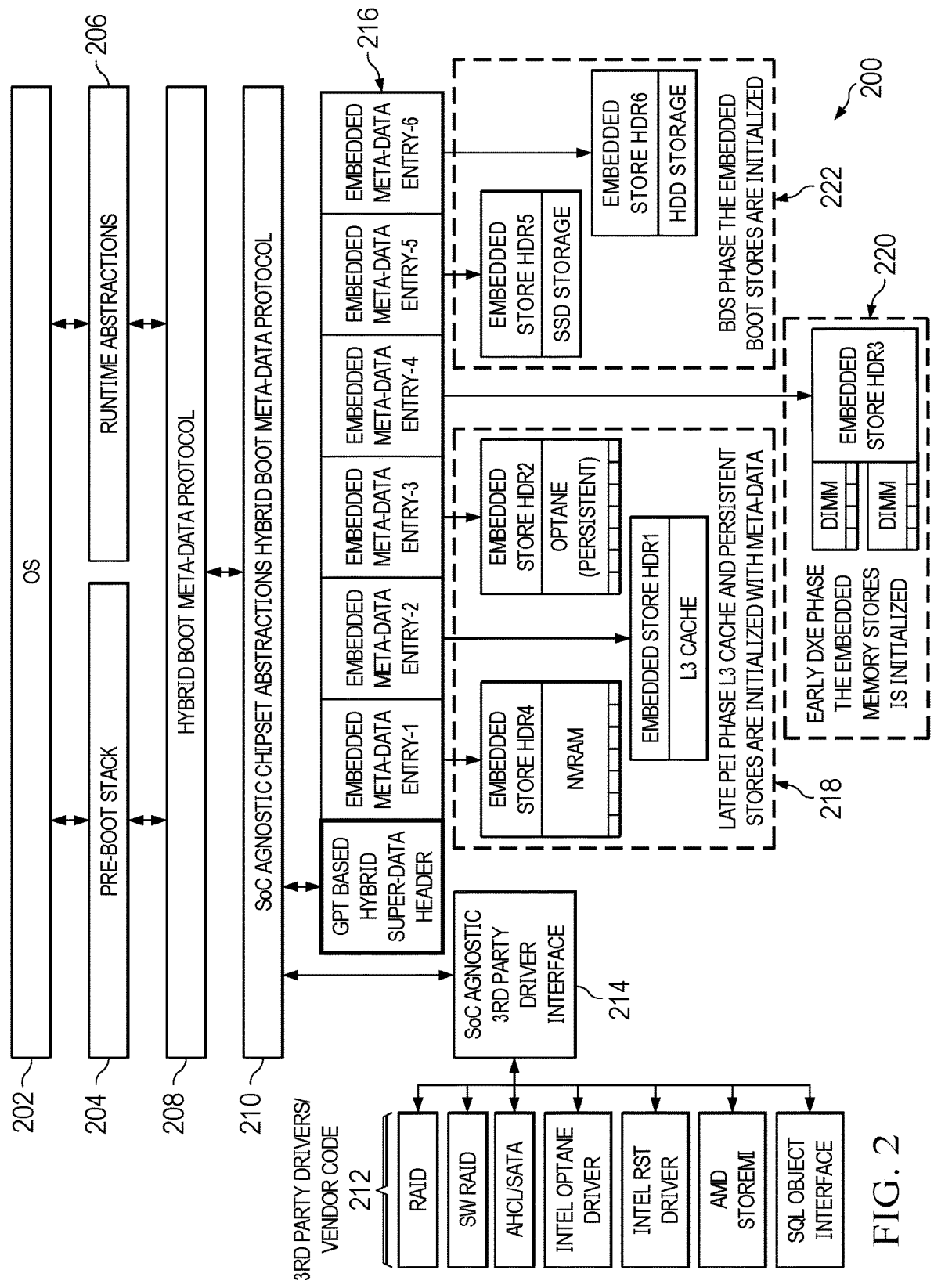
FIG. 2 is a diagram of a system for implementing an embedded GPT partition with hybrid boot load protocol and an SoC system for storage and third party drivers, in accordance with an example embodiment of the present disclosure.

FIG. 2 is a diagram of a system 200 for implementing an embedded GPT partition with hybrid boot load protocol and an SoC system for storage and third party drivers, in accordance with an example embodiment of the present disclosure. System 200 includes OS 202, pre-boot stack 204, runtime abstractions 206, hybrid boot metadata protocol 208, SoC agnostic chipset abstractions hybrid boot metadata protocol 210, third party drivers vendor codes 212, SoC agnostic third party driver interface 214, GPT based hybrid super-data headers 216, PEI phase L3 cache 218, early DXE phase cache 220 and BDS phase cache 222, each of which can be implemented in hardware or a suitable combination of hardware and software.

OS 202 can be a suitable operating system of a processor, and typically includes one or more algorithms stored in data memory devices of one or more data processors. OS 202 is configured for general operations and is also configured to be programmable to become a special purpose machine, as well as to program other controllers and system components as discussed herein.

Pre-boot stack 204 can be implemented as one or more algorithms operating on the processor and includes one or more sets of data, instructions or other suitable information that is used to prepare OS 202 for booting. In one example embodiment, the processor can execute instructions in pre-boot stack 204 using data in pre-boot stack 204 prior to booting. Pre-boot stack 204 is operatively coupled to OS 202 and hybrid boot metadata protocol 208.

Runtime abstractions 206 can be implemented as one or more algorithms that are configured to cause the processor to configure a hybrid boot load protocol to implement SoC agnostic chipset abstractions, which map memory device locations in GPT based hybrid super-data headers 216 into processor runtime data memory, for use in dynamic system recovery and vulnerability management from boot load modules. Runtime abstractions 206 is operatively coupled to OS 202 and hybrid boot metadata protocol 208.

Hybrid boot metadata protocol 208 can be implemented as one or more algorithms that cause the processor to map metadata into each device embedded header, such as Hdr1 to Hdr6 or other suitable headers, so that from any storage path the current boot load can be located and recovered. Hybrid boot metadata protocol 208 is coupled to pre-boot stack 204, runtime abstractions 206, SoC agnostic third party driver interface 214 and GPT-based hybrid super-data headers 216.

SoC agnostic chipset abstractions hybrid boot metadata protocol 210 can be implemented as one or more algorithms that cause the processor to dynamically load the corresponding driver version from third party drivers vendor codes 212, as a function of a current boot failure and vulnerability.

Third party drivers vendor codes 212 can be implemented as one or more algorithms operating on the processor that include driver code data for RAID, non-RAID, ACHI, SATA, memory accelerators, RST, AMD StoreMI, SQL Objects and other suitable drivers are coupled to SoC agnostic chipset abstractions hybrid boot metadata protocol 210 through SoC agnostic third party driver interface 214.

GPT based hybrid super-data headers 216 can be implemented as one or more algorithms operating on the processor that are coupled to SoC agnostic chipset abstractions hybrid boot metadata protocol 210 and PEI phase L3 cache 218, early DXE phase cache 220 and BDS phase cache 222, and is used to implement the hybrid boot metadata protocol, to learn the boot progress status and to implement boot continuity functionality by mapping the boot load module. The NVRAM, L3 cache, Optane memory and other suitable memory devices can be enumerated and initialized during a PEI phase at 218, DIMM can be initialized at 220 during DXE for a mapped table, and the current boot status entries can be loaded and executed as per the hybrid metadata index at 222.

PEI phase L3 cache 218 can be implemented as one or more algorithms operating on the processor that cause the processor to initialize persistent stores with metadata for use in a PEI phase. PEI phase L3 cache 218 is coupled to GPT based hybrid super-data headers 216.

Early DXE phase cache 220 can be implemented as one or more algorithms operating on the processor that cause the processor to initialize embedded memory stores. Early DXE phase cache 220 is coupled to GPT based hybrid super-data headers 216

BDS phase cache 222 can be implemented as one or more algorithms operating on the processor that cause the processor to initialize embedded boot stores. Early DXE phase cache 220 is coupled to GPT based hybrid super-data headers 216.

Figure 3:
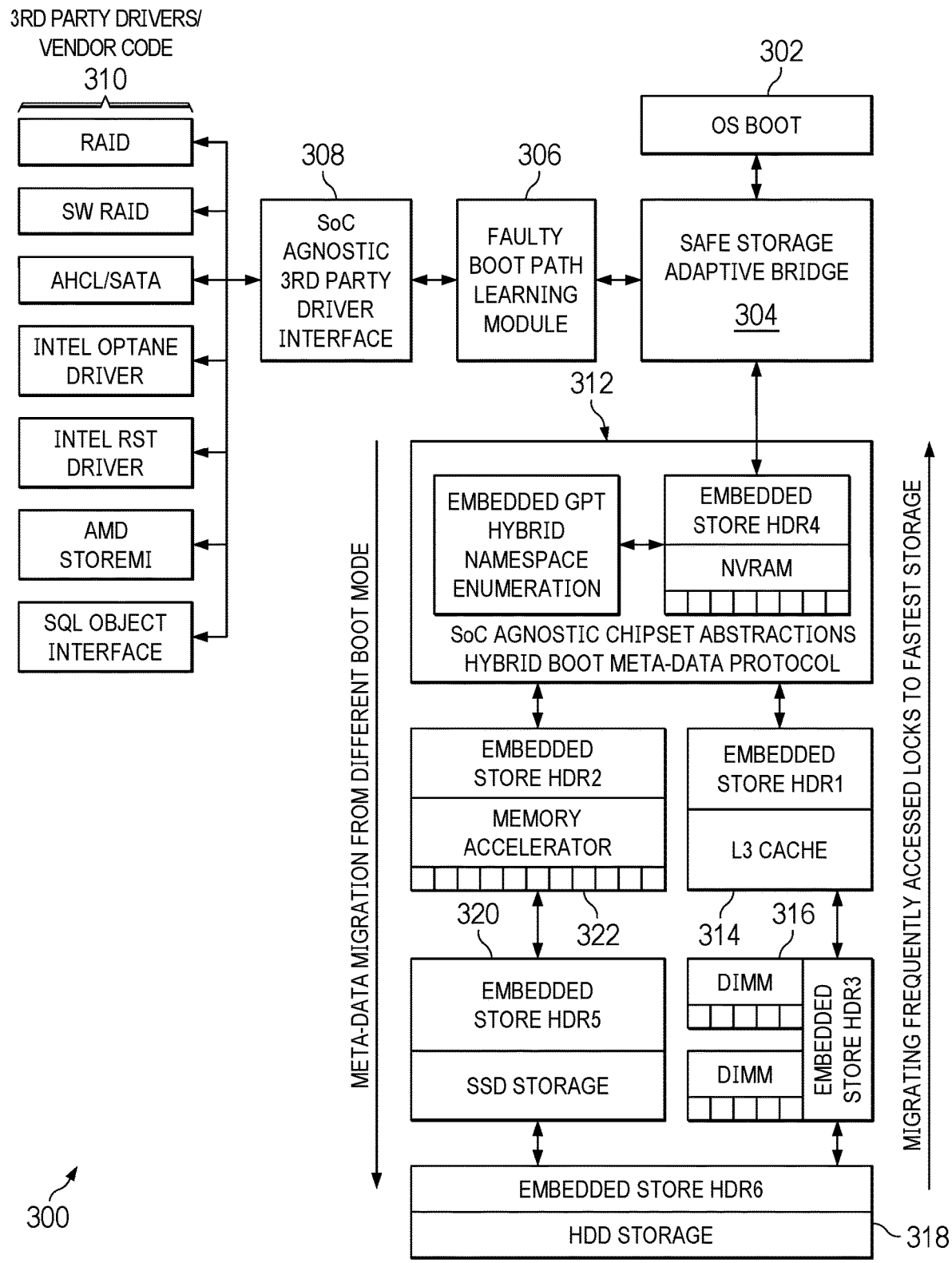
FIG. 3 is a diagram of a system for implementing an embedded GPT partition with hybrid boot load protocol and a safe storage adaptive bridge, in accordance with an example embodiment of the present disclosure.

FIG. 3 is a diagram of a system 300 for implementing an embedded GPT partition with hybrid boot load protocol and a safe storage adaptive bridge, in accordance with an example embodiment of the present disclosure. System 300 includes OS boot 302, safe storage adaptive bridge 304, SoC agnostic chipset abstractions hybrid boot metadata protocol 312, faulty boot path learning module 306, SoC agnostic third party driver interface 308, third party drivers vendor codes 310, L3 cache 314, DIMM 316, HDD 318, SSD 320 and memory accelerator 322, each of which can be implemented in hardware or a suitable combination of hardware and software.

OS boot 302 can be implemented as one or more algorithms operating on a processor that cause the processor to boot an operating system. OS boot 302 is coupled to safe storage adaptive bridge 304, and can be implemented as one or more algorithms operating on the processor that cause the processor to interface with SoC agnostic chipset abstractions hybrid boot metadata protocol 312 and faulty boot path learning module 306 to facilitate booting in conjunction with OS boot 302.

SoC agnostic chipset abstractions hybrid boot metadata protocol 312 can be implemented as one or more algorithms that cause the processor to dynamically load the corresponding driver version from third party drivers vendor codes 310, as a function of a current boot failure and vulnerability.

Faulty boot path learning module 306 can be implemented as one or more algorithms operating on the processor that cause the processor to identify faulty boot paths and to select an alternative boot path for use instead. Faulty boot path learning module 306 is coupled to SoC agnostic third party driver interface 308, which provides access to third party drivers vendor codes 310.

L3 cache 314, DIMM 316, HDD 318, SSD 320 and memory accelerator 322 provide support for metadata migration from faulty boot path learning module 306 and migration of frequently accessed blocks to the fastest storage device. In the example embodiment of system 300, SoC agnostic chipset abstractions hybrid boot metadata protocol 312 is coupled to memory accelerator 322 and L3 cache 314, with a serial connection from memory accelerator 322 to SDD 320, HDD 318, DIMM 316 and L3 cache 314. However, other suitable connections can also or alternatively be used. It is further noted that each memory device or system includes an embedded store Hdr, which is configured by and used by SoC agnostic chipset abstractions hybrid boot metadata protocol 312 to implement the migration functionality and for other suitable purposes.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for data processing, comprising:
    a data processor configured to execute one or more algorithms stored in an internal memory device;
    a plurality of external data memory devices coupled to the data processor, each external data memory device including a header having predetermined data stored therein; and
    a boot load protocol coupled to the data processor and the plurality of external data memory devices, the boot load protocol configured to interface with the data processor and the header of each of the plurality of external data memory devices and to generate a series of control data structures for use by the data processor to select one of the plurality of external data memory devices for use by the data processor, wherein the boot load protocol comprises one or more algorithms stored in the data processor and one or more algorithms stored in one or more of the external data memory devices, and includes a boot recovery mechanism cached into NVRAM with a reflex map table that includes a hybrid boot load protocol header that identifies a current boot load, to locate available globally unique identifier (GUID) partition table (GPT) based boot headers in each external data memory device.

2. The system of claim 1 wherein the boot load protocol comprises one or more algorithms.

3. The system of claim 1 wherein the boot load protocol comprises one or more algorithms stored in a data memory device.

4. The system of claim 1 wherein the boot load protocol comprises one or more first algorithms stored in the data processor, one or more second algorithms stored in one or more first data memory devices, and one or more third algorithms stored in one or more second data memory devices.

5. The system of claim 1 wherein the boot load protocol comprises one or more first algorithms stored in the data processor, one or more second algorithms stored in one or more first data memory devices, and one or more third algorithms stored in one or more second data memory devices, wherein the first algorithms are different from the second algorithms.

6. The system of claim 1 wherein the boot load protocol comprises one or more first algorithms stored in the data processor, one or more second algorithms stored in one or more first data memory devices, and one or more third algorithms stored in one or more second data memory devices, wherein the first algorithms are different from the second algorithms and the third algorithms.

7. The system of claim 1 wherein the boot load protocol comprises one or more first algorithms stored in the data processor, one or more second algorithms stored in one or more first data memory devices, and one or more third algorithms stored in one or more second data memory devices, wherein the first algorithms, the second algorithms and the third algorithms are different from each other.

8. The system of claim 1 wherein the boot load protocol comprises one or more first algorithms stored in the data processor, one or more second algorithms stored in one or more first data memory devices, and one or more third algorithms stored in one or more second data memory devices, wherein the first data memory devices are different from the second data memory devices.

9. A method for data processing, comprising:
    loading a boot load protocol including one or more algorithms from an internal memory device and one or more algorithms from one or more of a plurality of external data memory devices into a processor for execution;
    loading header data that includes a boot recovery mechanism from the plurality of external memory devices into NVRAM of the processor under control of the boot load protocol, using reflex mapping to generate a reflex map table that includes a hybrid boot load protocol header that identifies a current boot load, and available globally unique identifier (GUID) partition table (GPT) based boot headers in each external data memory device;
    interfacing the data processor with the header data for each of the plurality of external data memory devices;
    generating a series of control data structures for use by the data processor;
    selecting one of the plurality of external data memory devices for use by the data processor using the series of control data structures and the boot load protocol.

10. The method of claim 9 wherein the boot load protocol comprises one or more algorithms.

11. The method of claim 9 wherein the boot load protocol comprises one or more algorithms stored in one of the external data memory devices.

12. The method of claim 9 wherein the boot load protocol comprises one or more algorithms stored in the data processor and one or more algorithms stored in one or more of the external data memory devices.

13. The method of claim 9 wherein the boot load protocol comprises one or more first algorithms stored in the data processor, one or more second algorithms stored in one or more first data memory devices, and one or more third algorithms stored in one or more second data memory devices.

14. The method of claim 9 wherein the boot load protocol comprises one or more first algorithms stored in the data processor, one or more second algorithms stored in one or more first data memory devices, and one or more third algorithms stored in one or more second data memory devices, wherein the first algorithms are different from the second algorithms.

15. The method of claim 9 wherein the boot load protocol comprises one or more first algorithms stored in the data processor, one or more second algorithms stored in one or more first data memory devices, and one or more third algorithms stored in one or more second data memory devices, wherein the first algorithms are different from the second algorithms and the third algorithms.

16. The method of claim 9 wherein the boot load protocol comprises one or more first algorithms stored in the data processor, one or more second algorithms stored in one or more first data memory devices, and one or more third algorithms stored in one or more second data memory devices, wherein the first algorithms, the second algorithms and the third algorithms are different from each other.

17. The method of claim 9 wherein the boot load protocol comprises one or more first algorithms stored in the data processor, one or more second algorithms stored in one or more first data memory devices, and one or more third algorithms stored in one or more second data memory devices, wherein the first data memory devices are different from the second data memory devices.

18. The method of claim 9 wherein the reflex mapping comprises metadata reflex mapped into a hybrid boot load protocol header.

19. The method of claim 9 wherein the reflex mapping comprises embedded headers included in every storage component that are reflex mapped to a persistent table in an NVRAM as part of a hybrid boot load protocol.

* * * * *